(12) United States Patent
Leather

(10) Patent No.: US 6,405,894 B1
(45) Date of Patent: Jun. 18, 2002

(54) OBJECT ASSEMBLY DEVICE FOR ASSEMBLING ROLLING OBJECTS

(76) Inventor: Brendan N. Leather, 1524 Waterford Pl., Fort Mill, SC (US) 29708

( * ) Notice: Subject to any disclaimer, the term of this patent is extended or adjusted under 35 U.S.C. 154(b) by 0 days.

(21) Appl. No.: 09/526,991

(22) Filed: Mar. 16, 2000

(51) Int. Cl.[7] .................................................. B23Q 7/12
(52) U.S. Cl. ....................... 221/168; 221/163; 221/162; 221/156; 221/167
(58) Field of Search ................................. 221/156, 162, 221/163, 167, 168

(56) References Cited

U.S. PATENT DOCUMENTS

| | | | | |
|---|---|---|---|---|
| 562,572 A | * | 6/1896 | Carpenter | 221/168 |
| 2,065,319 A | * | 12/1936 | Lewis | 221/168 |
| 2,078,659 A | * | 4/1937 | Gualtiere | 221/168 |
| 2,803,377 A | * | 8/1957 | Wilson | 221/162 |
| 3,212,668 A | * | 10/1965 | Gleason et al. | 221/156 |
| 3,228,098 A | | 1/1966 | Taylor | |
| 3,258,106 A | * | 6/1966 | Booth | 221/156 |
| 3,259,962 A | | 7/1966 | Taylor | |
| 3,349,891 A | * | 10/1967 | Burgess | 198/396 |
| 3,401,832 A | * | 9/1968 | Cremieux | 221/273 |
| 3,572,494 A | * | 3/1971 | Aidlin | 198/33 |
| 3,577,623 A | | 5/1971 | Ono et al. | |
| 3,793,697 A | | 2/1974 | Inque et al. | |
| 4,462,508 A | * | 7/1984 | Grafius | 221/201 |
| 5,613,451 A | * | 3/1997 | Zook | 110/173 |
| 5,647,805 A | * | 7/1997 | Tarbox, Jr. | 473/137 |

\* cited by examiner

*Primary Examiner*—Christopher P. Ellis
*Assistant Examiner*—Michael E. Butler
(74) *Attorney, Agent, or Firm*—Adams, Schwartz & Evans, P.A.

(57) ABSTRACT

A object assembly device automatically assembles a collection of rolling objects of identical size and shape. The assembly device includes a collection hopper having an inlet for receiving rolling objects, and an outlet below the inlet for discharging rolling objects. An object assembler is rotatably mounted within the hopper between the inlet and the outlet. The assembler defines a single-line travel channel having an entrance end and an exit end, and a width sufficient to accommodate no more than a single line of rolling objects moving downstream in succession from the entrance end of the travel channel to the exit end. Objects entering the travel channel from the inlet of the hopper are discharged through the outlet of the hopper in an assembled single-line condition. A drive shaft is provided for rotating the object assembler relative to the collection hopper to avoid obstructing accumulation of rolling objects at the entrance end of the travel channel.

14 Claims, 6 Drawing Sheets

OBJECT ASSEMBLY DEVICE FOR ASSEMBLING ROLLING OBJECTS

TECHNICAL FIELD AND BACKGROUND OF INVENTION

This invention relates to a object assembly device for automatically assembling a collection of rolling objects, such as anti-friction bearings, buckshot, golf balls, gum drops, paint balls, and the like. The invention dispenses the rolling objects in continuous, single-line succession for loading into, for example, packaging and machinery.

Prior art devices for automatically feeding and assembling rolling objects are known, but have proven to be generally ineffective for many reasons. As a whole, these devices are relatively expensive, use complex machinery, are generally slow and inefficient, and will often damage the surface of the objects during assembly.

SUMMARY OF THE INVENTION

Therefore, it is an object of the invention to provide a object assembly device for automatically assembling a collection of rolling objects, and then dispensing the objects in continuous single-line succession.

It is another object of the invention to provide an object assembly device which is non-vibratory, quite, and smooth-running.

It is another object of the invention to provide an object assembly device which reduces the likelihood of any damage to the object during assembly.

It is another object of the invention to provide an object assembly device which feeds and assembles objects in a continuous, non-interrupted manner.

It is another object of the invention to provide an object assembly device which provides substantially accelerated assembly.

It is another object of the invention to provide an object assembly device which includes a variable speed control.

It is another object of the invention to provide an object assembly device which is non-magnetic.

It is another object of the invention to provide an object assembly device which is readily adapted for assembling objects of various size.

It is another object of the invention to provide an object assembly device which includes shielded internal components for protecting the objects from potential friction damage.

It is another object of the invention to provide an object assembly device which is a modular, self-contained unit.

It is another object of the invention to provide an object assembly device which can be mounted onto most existing machines.

It is another object of the invention to provide an object assembly device which can be manufactured in unlimited shapes and sizes.

It is another object of the invention to provide an object assembly device which can be mounted on or off an existing machine.

It is another object of the invention to provide an object assembly device which can be powered by an electric or pneumatic motor.

It is another object of the invention to provide an object assembly device which can be gear-driven or driven by one or more flex cables.

It is another object of the invention to provide an object assembly device which is conveniently disassembled for cleaning.

These and other objects of the present invention are achieved in the preferred embodiments disclosed below by providing a object assembly device for automatically assembling a collection of rolling objects of identical size and shape. The assembly device includes a collection hopper having an inlet for receiving rolling objects, and an outlet below the inlet for discharging rolling objects. An object assembler is rotatably mounted within the hopper between the inlet and the outlet. The assembler defines a single-line travel channel having an entrance end and an exit end, and a width sufficient to accommodate no more than a single line of rolling objects moving downstream in succession from the entrance end of the travel channel to the exit end. Objects entering the travel channel from the inlet of the hopper are discharged through the outlet of the hopper in an assembled single-line condition. Drive means are provided for rotating the object assembler relative to the collection hopper to avoid obstructing accumulation of rolling objects at the entrance end of the travel channel.

According to one preferred embodiment of the invention, the object assembler includes a rotary feed cone having a relatively large diameter top and a relatively small diameter bottom. The travel channel is a groove formed in an exterior surface of the rotary feed cone and extending from the top of the rotary feed cone to the bottom.

According to another preferred embodiment of the invention, the groove extends in a generally helical path around the rotary feed cone between the top and the bottom of the rotary feed cone.

According to yet another preferred embodiment of the invention, the groove extends in a generally straight path from the top to the bottom of the rotary feed cone.

According to yet another preferred embodiment of the invention, a stationary cone base is located within the collection hopper for receiving the rotary feed cone. The cone base has a tapered interior wall shaped to fit against the exterior of the rotary feed cone, and an object discharge opening operatively aligned with the groove at the bottom of the rotary feed cone. The discharge opening allows passage of objects outwardly through the cone base.

According to yet another preferred embodiment of the invention, a stationary cone cover is placed over the rotary feed cone to protect objects from friction damage caused during assembly.

According to yet another preferred embodiment of the invention, a diffuser plate is located above the stationary cone cover and has a generally convex top surface for directing objects entering the collection hopper outwardly towards an interior wall of the collection hopper.

According to yet another preferred embodiment of the invention, the diffuser plate has a diameter slightly less than an inside diameter of the collection hopper. A number of spaced openings are formed around a perimeter edge of the diffuser plate for allowing controlled passage of objects through the diffuser plate to the object feed cone.

According to yet another preferred embodiment of the invention, the drive means includes a longitudinal drive shaft operatively connected to a motor and to the rotary feed cone for rotating the feed cone relative to the collection hopper.

According to yet another preferred embodiment of the invention, a pivoted top is located at the inlet of the collection hopper, and is adapted for being opened to allow insertion of objects into the collection hopper.

According to yet another preferred embodiment of the invention, an outlet spout is located at the outlet of the collection hopper for controlling the single-line discharge of assembled objects.

According to yet another preferred embodiment of the invention, a flexible feed tube extends from the outlet spout for directing the discharge of assembled objects outwardly from the collection hopper.

According to yet another preferred embodiment of the invention, the object assembler is a rotary cone shield having a relatively small diameter top, an outwardly tapered side wall, and a relatively large diameter bottom shaped to fit against an interior wall of the collection hopper. The travel channel includes a hollow travel tube connected to and extending from a bottom perimeter edge of the cone shield for receiving and moving objects downstream towards the outlet of the collection hopper.

According to yet another preferred embodiment of the invention, the travel tube extends in a generally helical path.

In another embodiment, the invention is a method of automatically assembling a collection of rolling objects of identical size and shape. The method includes the steps of inserting the collection of rolling objects into a collection hopper having an inlet and an outlet. A single line of rolling objects is then formed in an object assembler located between the inlet and the outlet of the collection hopper. The object assembler is rotated to promote continuous passage of rolling objects through the object assembler, and outwardly through the outlet of the collection hopper in an assembled condition.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
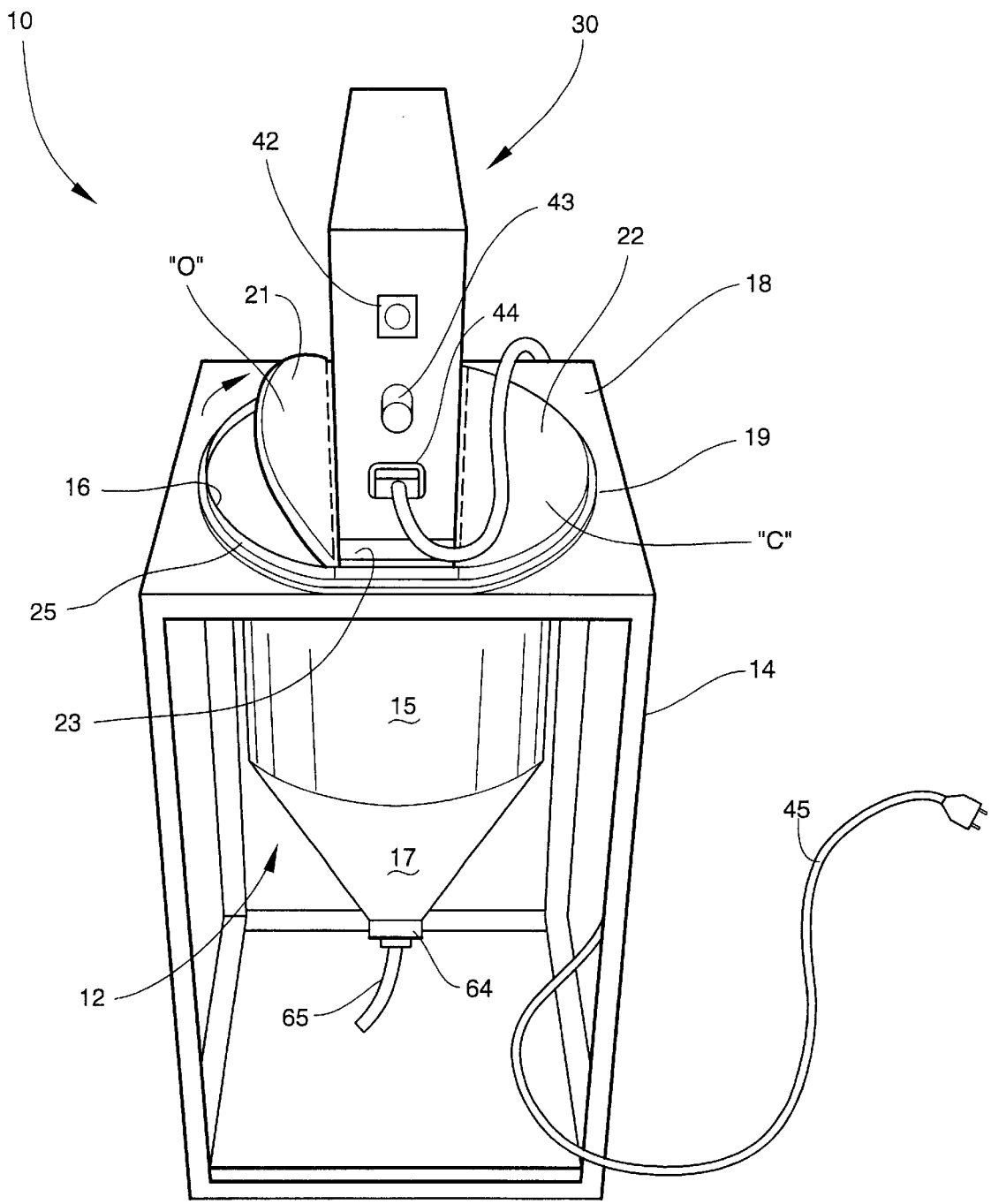
FIG. 1 is a perspective view of the object assembly device according to one preferred embodiment of the invention.

Referring now specifically to the drawings, a object assembly device according to the present invention is illustrated in FIG. 1 and shown generally at reference numeral 10. The device 10 is applicable for automatically assembling a collection of identical rolling objects, such as anti-friction bearings, buckshot, golf balls, gum drops, paint balls, and the like. The device 10 dispenses the assembled objects in continuous, single-line succession for convenient loading into, for example, machinery or packaging.

Figure 2:
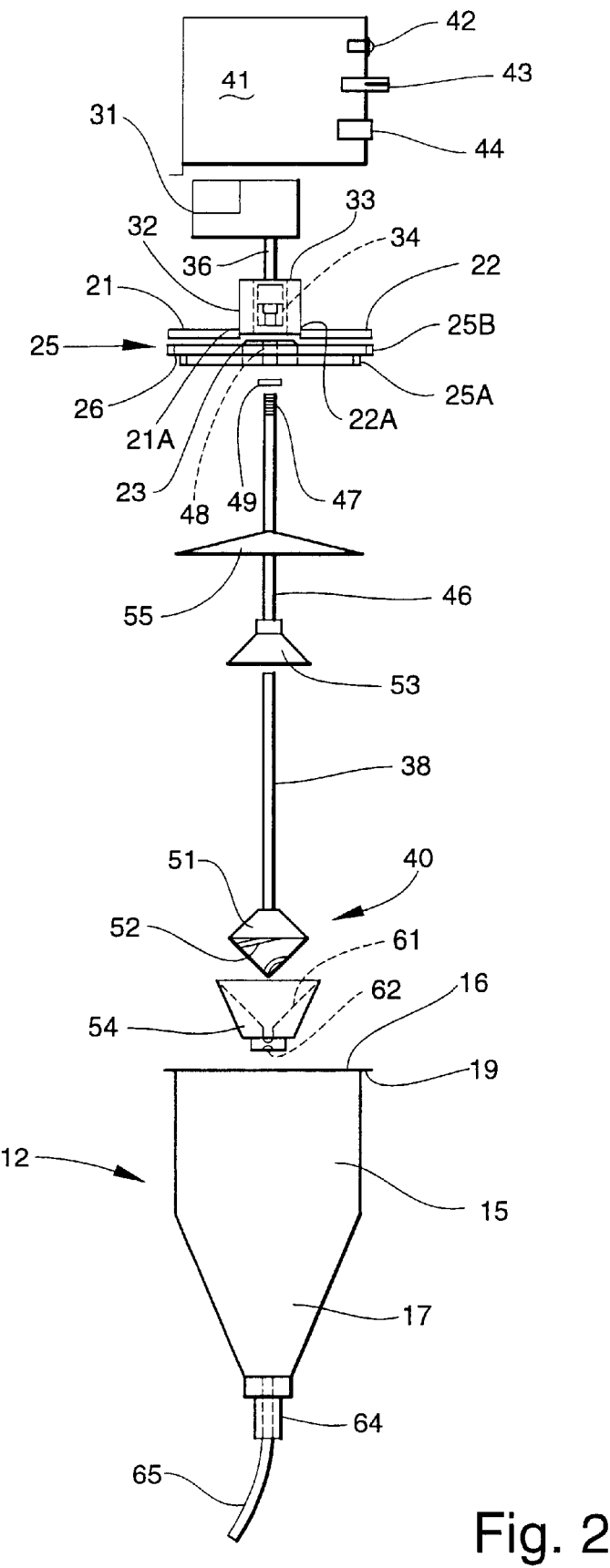
FIG. 2 is an exploded elevational view of the object assembly device with the motor housing and electric motor rotated 90 degrees for clarity.

Referring to FIGS. 1 and 2, the device 10 includes a collection hopper 12 vertically mounted on a support stand 14, and having a generally cylindrical upper body portion 15 with an open top 16 defining an inlet for receiving objects to be assembled, and a generally conical lower body portion 17 through which the assembled objects are dispensed. The collection hopper 12 fits into a center opening formed in a top wall 18 of the support stand 14, and has an outwardly extending annular mounting flange 19 around its open top 16. The mounting flange 19 attaches to the top wall of the support stand using metal screws, rivets, or other suitable means (not shown).

A pair of semi-circular hinged lids 21 and 22 are connected to a lateral crosspiece 23 of an annular lid brace 25 positioned over the open top 16 of the collection hopper 12. As shown in FIG. 2, the lid brace 25 has a lower ring member 25A with a diameter slightly less than an inner diameter of the collection hopper 12 at its open top 16, and an upper ring member 25B formed with the lower ring member 25A and having a greater diameter. The space between the upper and lower ring members 25A, 25B defines an annular shoulder 26 which engages the mounting flange 19 of the collection hopper 12 to support the lid brace 25 over the open top 16 of the collection hopper 12. The lids 21 and 22 are pivotable about their respective hinges 21A and 22A between an open position "O" for inserting objects into the collection hopper 12, and a closed position "C" for retaining objects in the collection hopper 12 during assembly. Preferably, the lids 21 and 22 are formed of a generally transparent durable plastic, such as Lexan.

A motor assembly 30 is centrally positioned above the collection hopper 12, and includes an electric motor 31 positioned on a mounted block 32 carried by the crosspiece 23 of the lid brace 25. The mounting block 32 has an opening 33 for receiving a drive shaft adapter 34 which interconnects the actuating arm 36 of the motor 31 and the vertical drive shaft 38 of an object assembler 40. A motor assembly housing 41 is placed over the electric motor 31 and includes an electric switch 42 and speed dial 43 connected to the motor 31 for controlling the operation and speed of the motor 31, and a power adapter inlet 44 for connecting a power cord 45 to an external power supply source.

The drive shaft 38 of the object assembler 40 extends through a stationary tubular sleeve 46. The sleeve 46 has a threaded end 47 which mates with a complementary-threaded opening 48 formed in the crosspiece 23 of the lid brace 25, and aligned with the actuating arm 36 of the motor 31. A lock-nut 49 is used to prevent rotation and inadvertent detachment of the sleeve 46 from the lid brace 25 during operation of the device 10.

Figure 3:
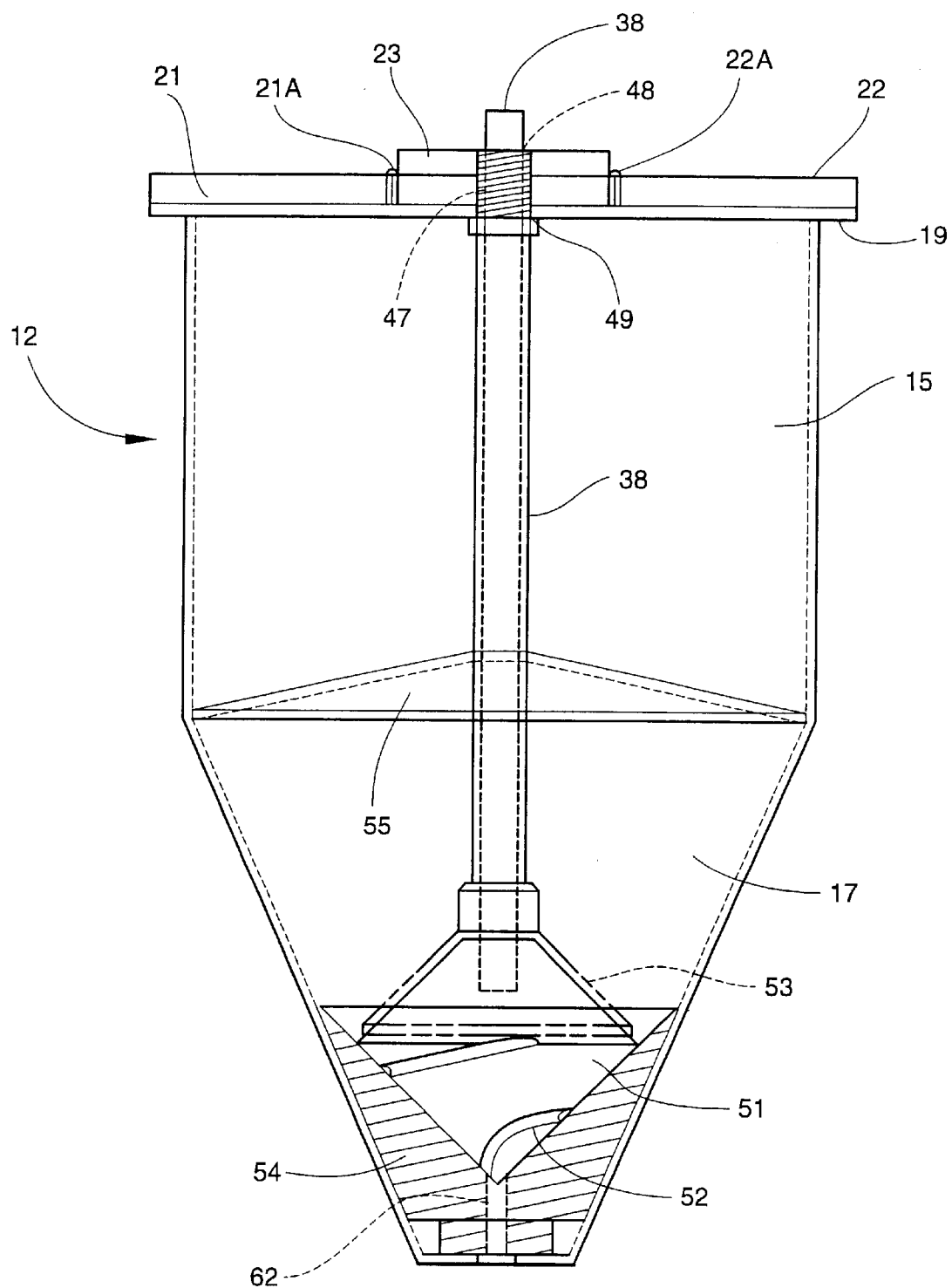
FIG. 3 is an elevational view of the collection hopper with a surface broken away to show the interior components of the object assembly device, and showing the cone base in cross-section and cone cover in phantom.
Figure 4:
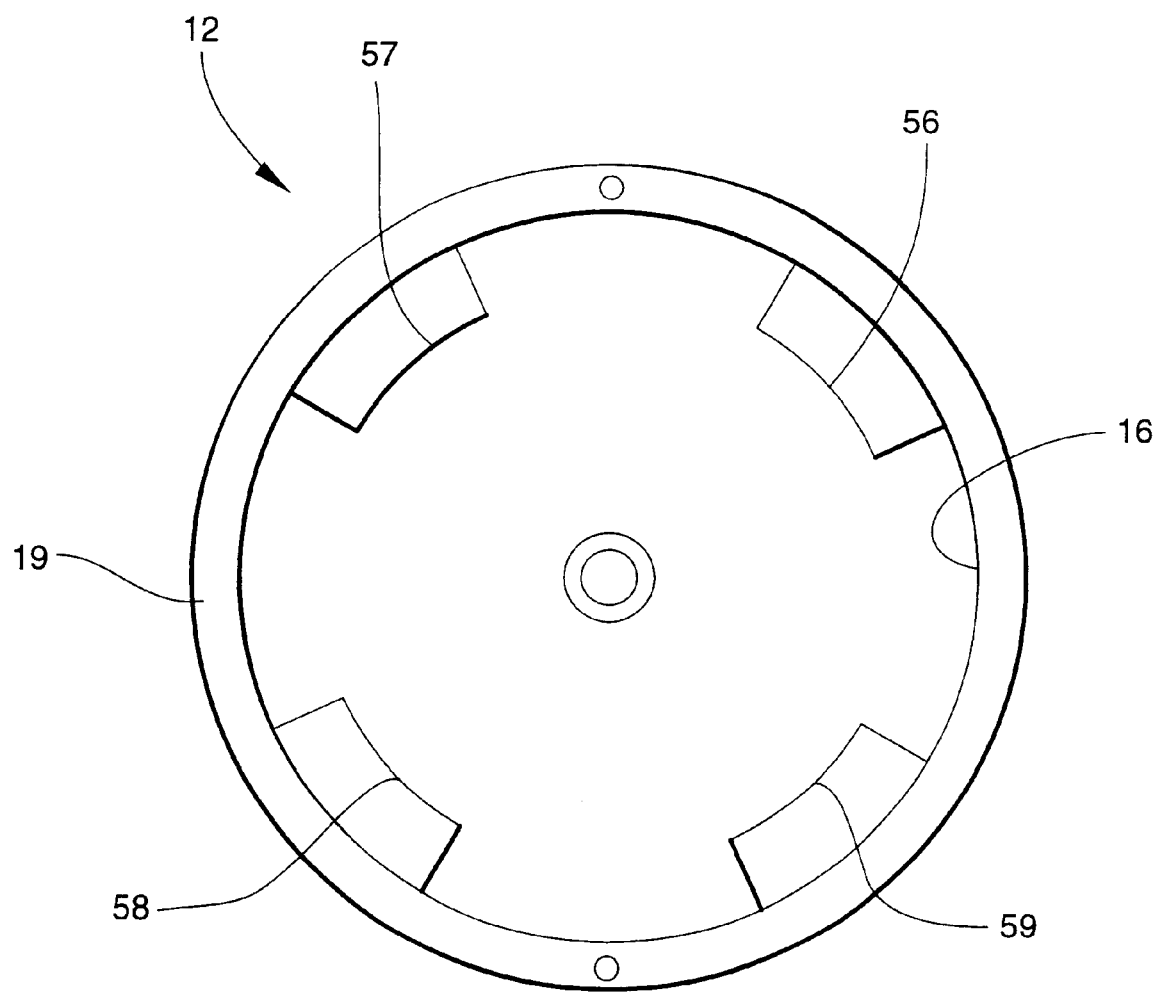
FIG. 4 is a top plan view of the collection hopper with the motor assembly removed and showing the openings of the weight diffuser plate.

According to one embodiment, the object assembler 40 comprises a rotary feed cone 51 with a helical groove 52 formed around its exterior surface. The groove 52 extends substantially 360 degrees from a top of the feed cone 51 to the bottom, and defines an object travel channel through which the objects travel in continuous, single-line succession to the outlet of the collection hopper 12. As best shown in FIGS. 2 and 3, the rotary feed cone 51 fits between a stationary cone cover 53 attached to an end of the tubular sleeve 46 and a stationary cone base 54. The cone cover 53 provides a protective barrier between the objects contained in the collection hopper 12 and an upper end of the rotary feed cone 51. A generally convex weight diffuser plate 55 is attached to the stationary sleeve 46 above the cone cover 53, and has several spaced perimeter openings 56, 57, 58, and 59 (See FIG. 4) adapted to control the delivery of objects from the inlet of the collection hopper 12 to the rotary feed cone 51, thereby limiting any damage to the objects which may result upon their random insertion into the collection hopper 12.

Referring again to FIGS. 2 and 3, the cone base 54 has a tapered interior wall 61 shaped to fit against the exterior of the rotary feed cone 51, and an object discharge opening 62 aligned with an exit end of the groove 52 at the bottom of the rotary feed cone 51 to allow passage of objects outwardly through the cone base 54. The cone base 54 connects to an outlet spout 64 which controls the single-line discharge of assembled objects outwardly from the collection hopper 12. A flexible feed tube 65 is preferably connected to the outlet spout 64, and serves to direct the discharge of assembled objects into, for example, machinery or packaging, as desired by the user.

Operation of the Object Assembly Device 10

To operate the object assembly device 10, the user first activates the electric motor 31 by pressing switch 42 on the motor assembly housing 41. The electric motor 31 powers the actuating arm 36 causing rotation of the drive shaft 38 attached to the rotary feed cone 51. The drive shaft 38 rotates the rotary feed cone 51 at a selected speed set by the user using the speed dial 43. One of the lids 21 is then opened, and a collection of like rolling objects to be assembled is poured into the collection hopper 12. The objects fall vertically against the weight diffuser plate 55 and immediately roll outwardly towards the inner wall of the collection hopper 12 and through the openings 56, 57, 58, and 59 formed in the diffuser plate 55. The objects accumulate in an annular loading zone "Z" formed between the stationary cone cover 53, rotary feed cone 51, and cone base 54, and are captured one object at a time at the entrance end of the travel channel defined by the helical groove 52. The space defining the object loading zone "Z" is adjustable by adjusting the location of the stationary cone cover 53 relative to the rotary feed cone 51 based on the amount of tubular sleeve 46 received into the threaded opening 48 of the crosspiece 23. Continuous rotation of the feed cone 51 prevents obstructing accumulation of objects at the entrance end of the helical groove 52. As the feed cone 51 rotates, the objects move downstream along the helical groove 52 in continuous single-line succession, and outwardly from the collection hopper 12 through the outlet spout 64 and feed tube 65. Preferably, the device 10 is capable of dispensing as many as 50 0.25" diameter ball-bearings in a single revolution of the rotary feed cone 51.

Alternative Embodiments

Figure 5:
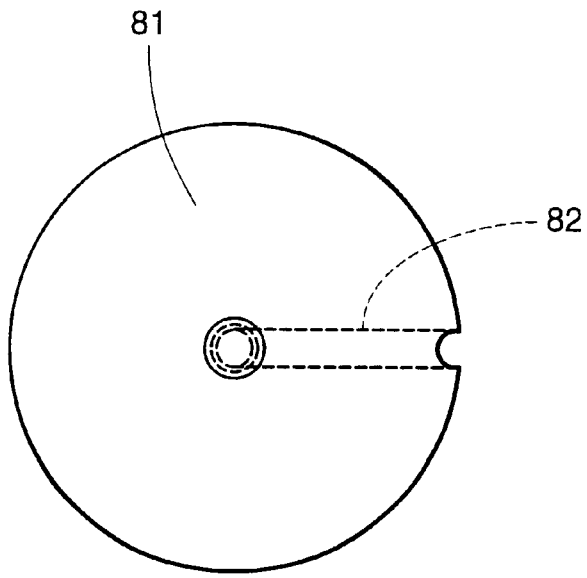
FIG. 5 is a top plan view of a rotary feed cone according to a second preferred embodiment of the invention.
Figure 6:
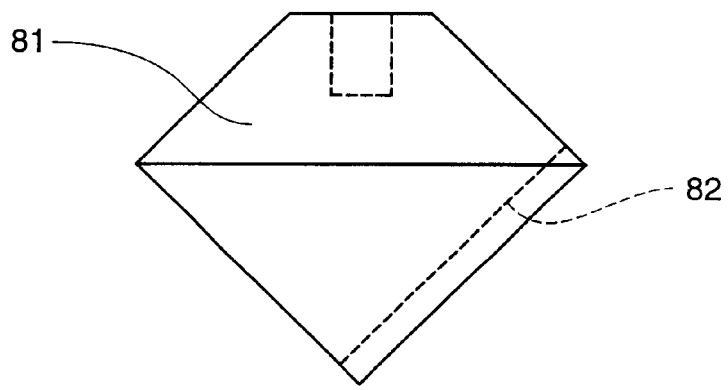
FIG. 6 is a side elevational view of the rotary feed cone shown in FIG. 5.
Figure 7:
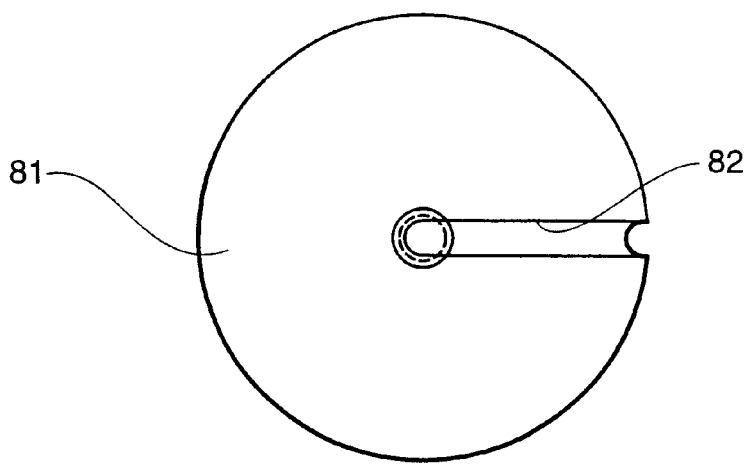
FIG. 7 is a bottom plan view of the rotary feed cone shown in FIGS. 5 and 6.

A second embodiment of the rotary feed cone is illustrated in FIGS. 5, 6, and 7. The rotary feed cone 81 operates within an identical environment described above with reference to the rotary feed cone 51, and has a generally straight line groove 82 formed in its exterior surface which extends from a top of the feed cone 81 to the bottom. The groove 82 defines an object travel channel through which the objects travel in continuous, single-line succession to the outlet of the collection hopper.

Figure 8:
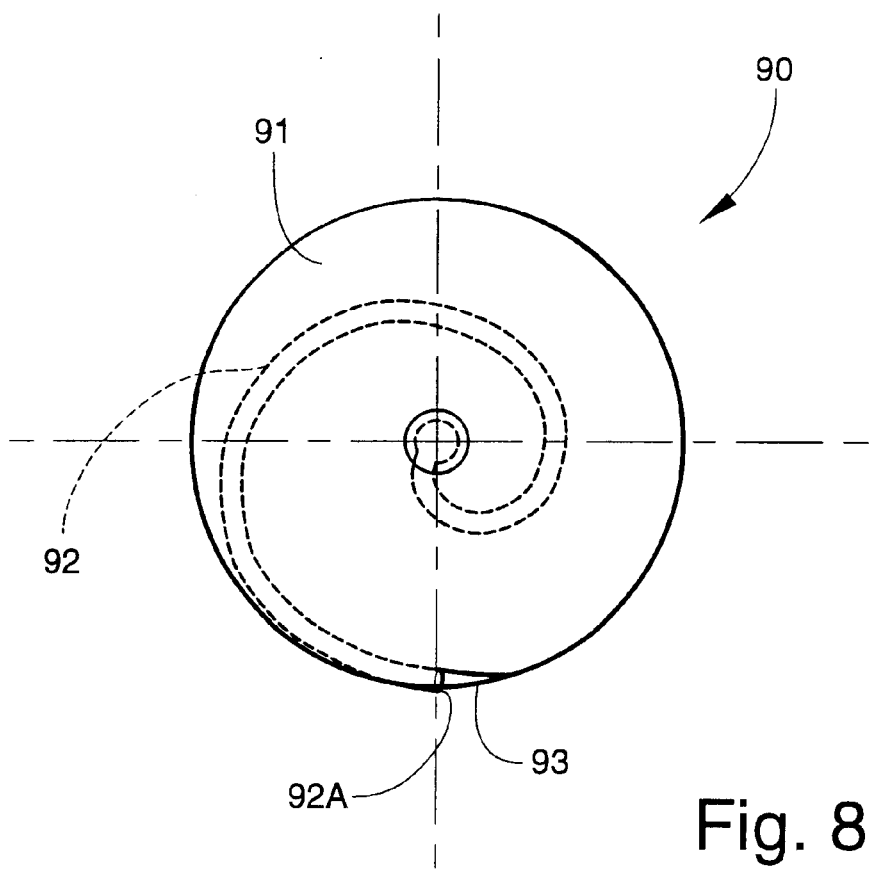
FIG. 8 is top plan view of an object assembler according to yet another preferred is embodiment of the invention.
Figure 9:
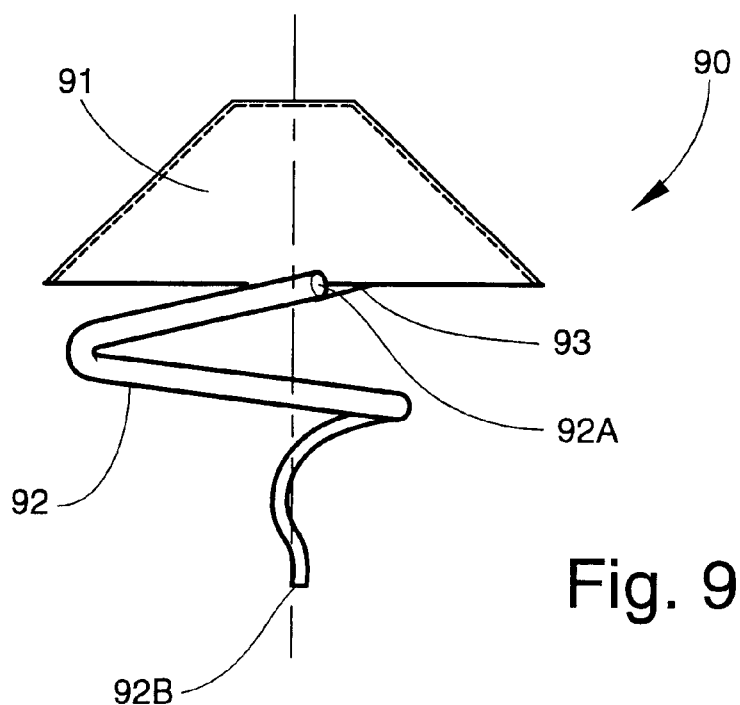
FIG. 9 is a side elevational view of the object assembler shown in FIG. 8.

A still further embodiment of an object assembler is shown in FIGS. 8 and 9. The object assembler 90 includes an inverted rotary cone 91 attached to the vertical drive shaft (not shown), and having a bottom perimeter diameter which is slightly less than the inner diameter of the collection hopper to seal the space between the rotary cone 91 and collection hopper. A helical tube 92 defining an object travel channel depends from the bottom perimeter of the rotary cone 91, and has an entrance opening 92A aligned with a descending loading ramp 93 formed in the rotary cone 91. The helical tube 92 directs the objects to be assembled downstream in single-line succession from the inlet of the collection hopper to the outlet. Continuous rotation of the rotary cone 91 prevents obstructing accumulation of objects at the entrance opening 92A of the helical tube 92. The exit opening 92B of the helical tube 92 is aligned with an outlet spout and flexible tube, as previously described.

An object assembly device is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. An object assembly device for automatically assembling a collection of rolling objects of identical size and shape, said assembly device comprising:

(a) a collection hopper having an inlet for receiving rolling objects, and an outlet below said inlet for discharging rolling objects;

(b) an object assembler rotatably mounted within said hopper between the inlet and the outlet, said object assembler comprising a rotary feed cone having a relatively large diameter top and a relatively small diameter bottom, and defining a single-line travel channel extending between the top and bottom of said rotary feed cone, said travel channel comprising a groove formed in an exterior surface of said rotary feed cone and having an entrance end at the top of said rotary feed cone and an exit end at the bottom of said rotary feed cone, and a width sufficient to accommodate no more than a single line of rolling objects moving downstream in succession from the entrance end of said travel channel to the exit end, such that objects entering said travel channel from the inlet of said hopper are discharged through the outlet of said hopper in an assembled single-line condition; and (c) drive means for rotating said object assembler relative to said collection hopper to avoid obstructing accumulation of rolling objects at the entrance end of said travel channel.

2. An object assembly device according to claim 1, wherein said object assembler comprises a rotary feed cone having a relatively large diameter top and a relatively small diameter bottom, and wherein said travel channel comprises a groove formed in an exterior surface of said rotary feed cone and extending from the top of said rotary feed cone to the bottom.

3. An object assembly device according to claim 2, wherein said groove extends in a generally helical path around said rotary feed cone between the top and the bottom of said rotary feed cone.

4. An object assembly device according to claim 2, wherein said groove extends in a generally straight path from the top to the bottom of said rotary feed cone.

5. An object assembly device according to claim 2, and comprising a stationary cone base located within said collection hopper for receiving said rotary feed cone and having a tapered interior wall shaped to fit against the exterior of said rotary feed cone, and an object discharge opening operatively aligned with the groove at the bottom of said rotary feed cone to allow passage of objects outwardly through said cone base.

6. An object assembly device according to claim 2, and comprising a stationary cone cover placed over the rotary feed cone to protect objects from friction damage caused during assembly.

7. An object assembly device according to claim 6, and comprising a diffuser plate located above the stationary cone cover and having a generally convex top surface for directing objects entering said collection hopper outwardly towards an interior wall of said collection hopper.

8. An object assembly device according to claim 7, wherein said diffuser plate has a diameter slightly less than an inside diameter of said collection hopper, and a number of spaced openings formed around a perimeter edge of said diffuser plate for allowing controlled passage of objects through the diffuser plate to the object feed cone.

9. An object assembly device according to claim 2, wherein said drive means comprises a longitudinal drive shaft operatively connected to a motor and to said rotary feed cone for rotating said feed cone relative to said collection hopper.

10. An object assembly device according to claim 1, and comprising a pivoted lid located at the inlet of said collection hopper, and adapted for being opened to allow insertion of objects into said collection hopper.

11. An object assembly device according to claim 1, and comprising an outlet spout located at the outlet of said collection hopper for controlling the single-line discharge of assembled objects.

12. An object assembly device according to claim 11, and comprising a flexible feed tube extending from said outlet spout for directing the discharge of assembled objects outwardly from said collection hopper.

13. An object assembly device according to claim 1, wherein said object assembler comprises a rotary cone shield having a relatively small diameter top, an outwardly tapered side wall, and a relatively large diameter bottom shaped to fit against an interior wall of said collection hopper, and wherein said travel channel comprises a hollow travel tube connected to and extending from a bottom perimeter edge of said cone shield for receiving and moving objects downstream towards the outlet of said collection hopper.

14. An object assembly device according to claim 13, wherein said travel tube extends in a generally helical path.

* * * * *